(12) United States Patent
Nilson et al.

(10) Patent No.: US 10,099,784 B1
(45) Date of Patent: Oct. 16, 2018

(54) FRAME FOR ROTARY WING AIRCRAFT

(71) Applicant: FPV Manuals LLC, Sarasota, FL (US)

(72) Inventors: Tim Nilson, Sarasota, FL (US); Frank Dankbaar, Mullsjoe (SE)

(73) Assignee: FPV Manuals LLC, Sarasota, FL (US)

( * ) Notice: Subject to any disclaimer, the term of this patent is extended or adjusted under 35 U.S.C. 154(b) by 381 days.

(21) Appl. No.: 14/822,598

(22) Filed: Aug. 10, 2015

Related U.S. Application Data

(60) Provisional application No. 62/036,051, filed on Aug. 11, 2014.

(51) Int. Cl.
*B64C 39/02* (2006.01)

(52) U.S. Cl.
CPC ...... *B64C 39/024* (2013.01); *B64C 2201/024* (2013.01); *B64C 2211/00* (2013.01)

(58) Field of Classification Search
CPC ............... B64C 39/024; B64C 2211/00; B64C 2201/024
See application file for complete search history.

(56) References Cited

U.S. PATENT DOCUMENTS

| | | | | |
|---|---|---|---|---|
| 8,453,962 | B2 * | 6/2013 | Shaw | B64C 27/20 244/12.4 |
| 8,544,788 | B1 * | 10/2013 | Capper | B64B 1/28 244/30 |
| 9,061,763 | B1 * | 6/2015 | Christensen | A63H 17/28 |
| 9,334,051 | B2 * | 5/2016 | Masticola | B64C 39/024 |
| 9,616,998 | B2 * | 4/2017 | Oakley | B64C 39/024 |
| 9,623,968 | B2 * | 4/2017 | Rimanelli | B64C 39/024 |
| 9,630,713 | B1 * | 4/2017 | Von Novak, III | B64C 39/024 |
| D789,457 | S * | 6/2017 | McCartin | D21/453 |
| 9,688,400 | B2 * | 6/2017 | Hutson | B64C 39/024 |
| 2016/0185454 | A1 * | 6/2016 | Hutson | B64C 39/024 244/17.23 |

* cited by examiner

*Primary Examiner* — Brian M O'Hara
*Assistant Examiner* — Keith L Dixon
(74) *Attorney, Agent, or Firm* — Frijouf, Rust & Pyle P.A

(57) ABSTRACT

An improved frame is disclosed for a rotary wing aircraft comprising a power frame having a power frame lower element and a power frame upper element. A curved beam extends between a first and a second end and having a lower and an upper edge. A coupling secures the lower and an upper edge of the curved beam to the power frame lower element and the power frame upper element for stabilizing the power frame to reduce flexing and vibration of the power frame.

19 Claims, 5 Drawing Sheets

FRAME FOR ROTARY WING AIRCRAFT

CROSS-REFERENCE TO RELATED APPLICATIONS

This application claims benefit of U.S. Patent Provisional application No. 62/036,051 filed Aug. 11, 2014. All subject matter set forth in provisional application No. 62/036,051 filed Aug. 11, 2014 is hereby incorporated by reference into the present application as if fully set forth herein.

BACKGROUND OF THE INVENTION

Field of the Invention

This invention relates to aircraft and more specifically to an improved frame for a rotary wing aircraft such as an unmanned rotary wing aircraft and the like.

Description of the Related Art

Various types of fuselage structures have been proposed by the prior an to accommodate the many diverse designs of aircraft. Although many of these various types of fuselage structures appear to be unrelated, all of the fuselage structures are required to be strong and light weight. Much of the strength of these fuselage structures comes from the internal frame supporting an outer fuselage structure. The following prior art illustrate attempts of the prior art to provide a strong and a light weight frame or an aircraft.

U.S. Pat. No. 4,310,132 to Robinson et al. discloses a fuselage structure in which the skin is comprised of layers of a matrix fiber reinforced composite, with the stringers reinforced with the same composite material. The high strength to weight ratio of the composite, particularly at elevated temperatures, and its high modulus of elasticity, makes it desirable for use in airplane structures.

U.S. Pat. No. 8,151,529 to Weldmann et al. discloses a curved beam of fiber composite material. The beam includes a first flange curved in a longitudinal direction, a second flange curved in a longitudinal direction and having a greater longitudinal extent than the first flange, and a web curved in a longitudinal direction and extending between the first flange and the second flange. The beam includes a fiber composite laminate including layers of fibers having different fiber directions, wherein a fiber density per unit of area of the second flange is lower than a fiber density per unit of area of the first flange, and wherein the first flange, the second flange and the web are seamless, continuous, and unfolded in a longitudinal direction.

US Patent Application Publication 2009/0266936 to Fernandez et al. discloses an aircraft fuselage structures have reinforcement members in the vicinity of the stringer openings formed in frame members and are rigidly lap joined to a surface region of the frame members by a friction stir weld region. Such aircraft fuselage structural components may thus be provided with plural longitudinally spaced-apart frame members defining a transversal cross-section of an aircraft fuselage section, the frame members having a plurality of stringer holes therethrough, and plural longitudinally oriented stringers each being positioned within a respective one of the stringer holes of the frame member. The reinforcement members are lap joined to corresponding surfaces of frame members in the vicinity of the stringer holes such that the reinforcement members are joined rigidly to the corresponding surfaces of the frame members by a friction stir weld region.

US Patent Application Publication 2012/0119028 to Griess et al. discloses a fuselage structure includes a fuselage body and framework for stiffening the body. The framework includes at least one frame member having a duct therein for routing a utility through the body.

US Patent Application Publication 2014/0027573 to Cazeneuve et al discloses an aircraft fuselage structural element has the general form of an elongated profile and includes a web and at least one flange. The at least one flange has a curved cross-section tangent to the web. Use in a profile to increase the residual compressive strength after impact.

One specialized type of aircraft is an unmanned rotary wing aircraft. Typically, unmanned rotary wing aircraft are based on an X shape frame or an H shape frame. Each of the X or H shape frame support a plurality of electric motors. Each of the electric motors independently drives a propeller for control the speed, direction and the attitude of the unmanned rotary wing aircraft.

In my prior invention, I proposed a frame having a power frame and a separate electronic frame interconnected by a plurality of resilient couplers. The plurality of resilient couplers isolated the stress and vibration of the power frame from the electronic frame. My prior invention functioned as intended and was well accepted in the marketplace.

It is an object of the present invention to improve upon my prior invention and improved the strength of the power frame.

Therefore, it is an object of the present invention to provide an improved frame for a rotary wing aircraft which add mechanical strength in multiple dimensions.

Another object of the present invention is to provide an improved frame for a rotary wing aircraft which add mechanical strength at a low cost.

Another object of the present invention is to provide an improved frame for a rotary wing aircraft which add mechanical strength with little or no additional weight.

Another object of the present invention is to provide an improved frame for a rotary wing aircraft which add mechanical strength and may be assembled with common tools.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved frame for a rotary wing aircraft. The improved frame comprises a power frame having a power frame lower element and a power frame upper element. The power frame lower element is disposed in a substantially parallel relationship. A curved beam extends between a first and a second end and having a lower and an upper edge. A coupling secures the lower and an upper edge of the curved beam to the power frame lower element and the power frame upper element for stabilizing the power frame to reduce flexing and vibration of the power frame.

In a more specific example of the invention, the curved beam is formed from a resilient material. The coupling comprises a lower and an upper tab extending from the lower and an upper edge of the curved beam. A lower and an upper recess are defined in the power frame lower element and the power frame upper element. The lower and upper tabs are insertable into the lower and upper recesses for securing the curved beam to the power frame. A plurality of support interconnecting the power frame lower element to the power frame upper element for applying a compressive force between the power frame lower element and the power frame upper element for maintaining insertion of the lower and an upper tabs into the lower and an upper recesses in the power frame lower element and the power frame upper element.

In another more specific example of the invention, a first, second and third supports interconnect the power frame lower element to the power frame upper element. The first, second and third supports apply a compressive force between the power frame lower element and the power frame upper element to secure the lower and an upper edge of the curved beam to the power frame lower element and the power frame upper element. One of the first, second and third supports is offset relative to the other of the first, second and third supports. The curved beam is positioned along the first, second and third supports for accommodating the curve of the curved beam.

In still another more specific example of the invention, the power frame is substantially rectangular extending longitudinally between a first and a second end and bounded by a first and a second edge. The curved beam includes a first and second curved beam extending longitudinally between the first and second ends and located adjacent to the first and second edges, respectively.

The invention is also incorporated into an improved frame for a rotary wing aircraft. The improved frame comprises a power frame having a power frame lower element and a power frame upper element. A plurality of arms extend from the power frame for mounting a plurality of driven propellers. A plurality of resilient couplings connects and isolates a carrier frame from the power frame for inhibiting transmission of vibrations from the power frame to the carrier frame. A sensor is mounted to the carrier frame for sensing regions about the rotary wing aircraft. An electronic flight control controls the plurality of driven propellers of the rotary wing aircraft. A transceiver is connected to the sensor and to the electronic flight control for receiving data from the sensor and for directing the flight of the rotary wing aircraft. A curved beam is interposed between the power frame lower element and the power frame upper element. A coupling secures the curved beam to the power frame lower element and the power frame upper element for stabilizing the power frame to reduce flexing and vibration of the power frame.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
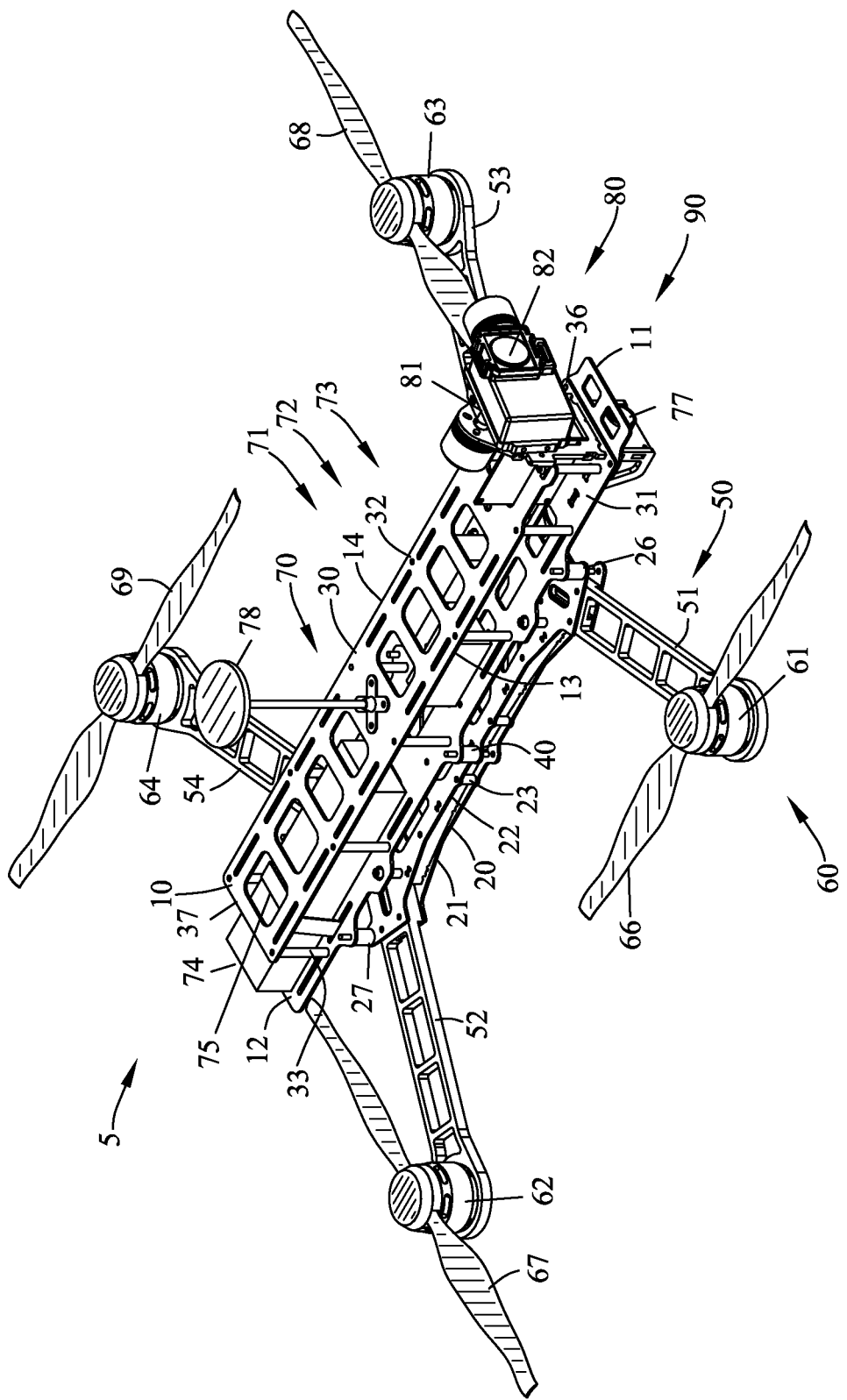
FIG. 1 is an isometric view of a rotary wing aircraft incorporating the improved frame of the present invention.
Figure 2:
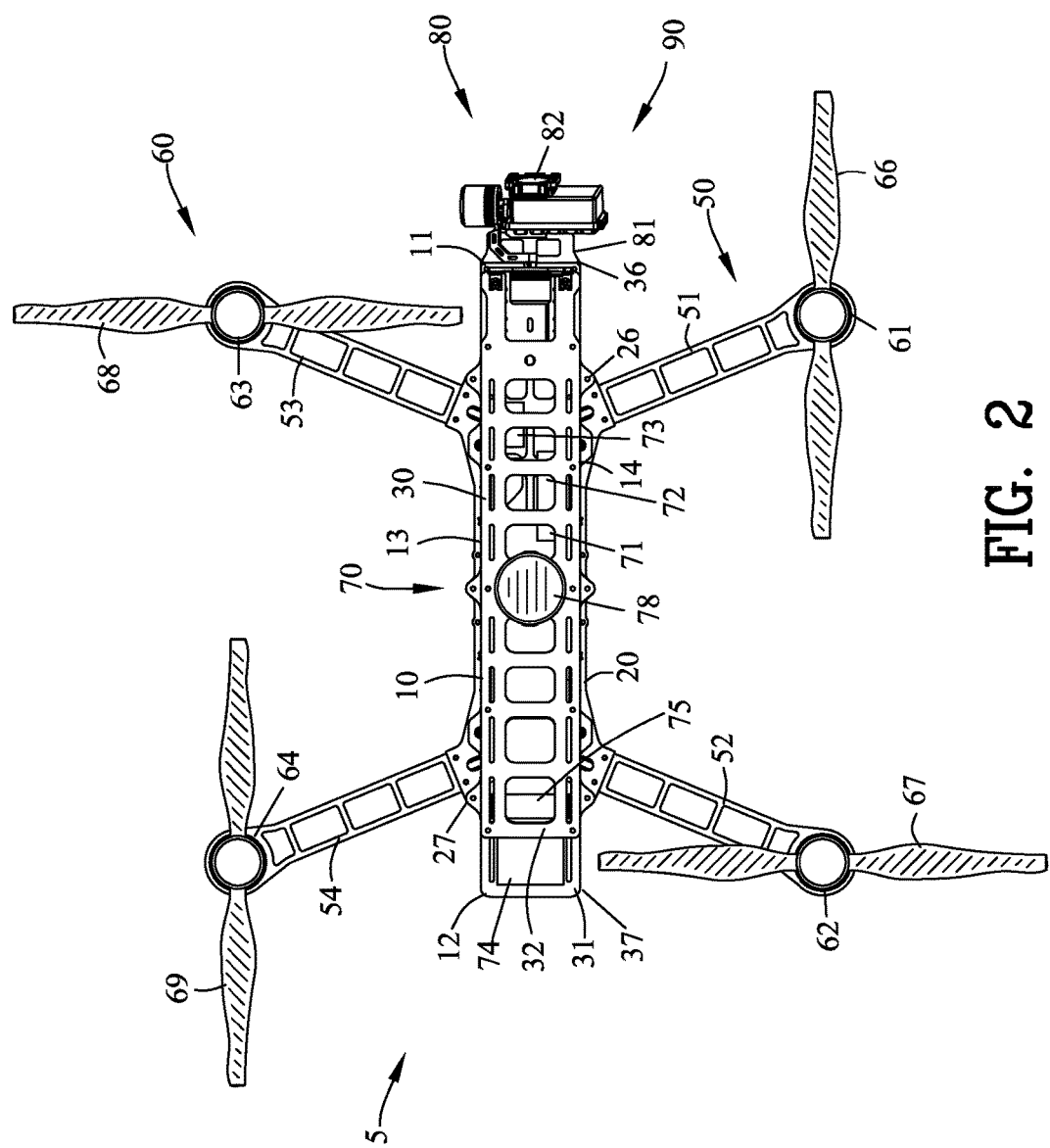
FIG. 2 is a top view of the rotary wing aircraft of FIG. 1.
Figure 3:
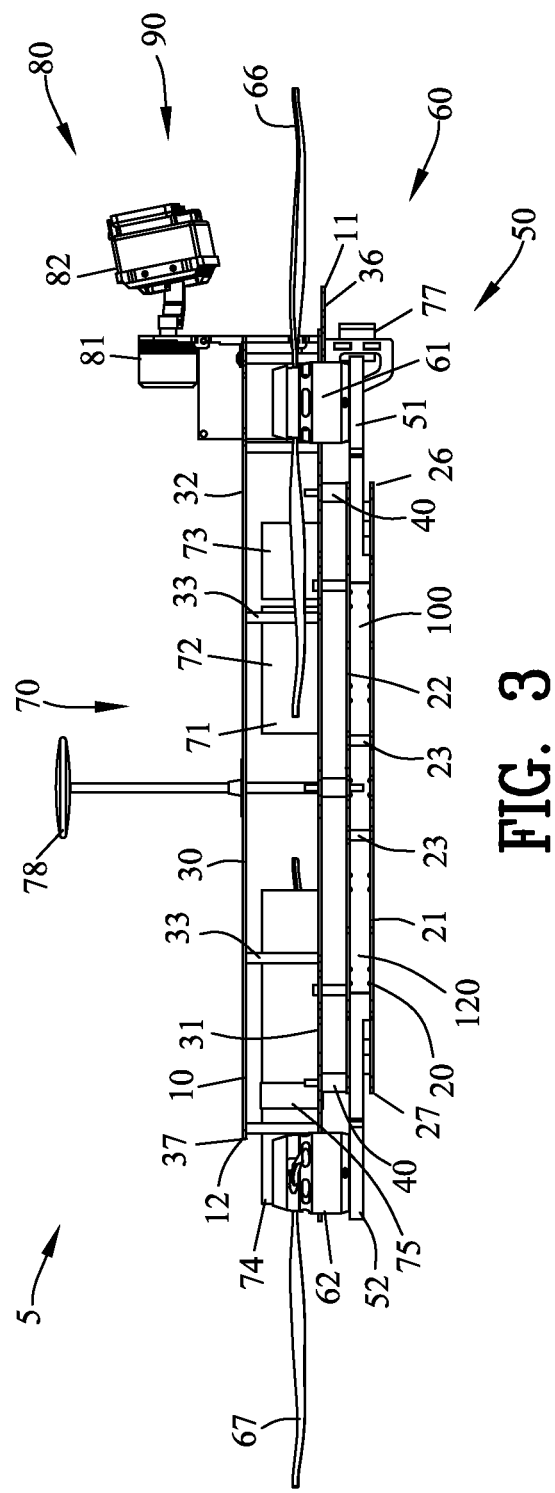
FIG. 3 is a side of FIG. 2.
Figure 4:
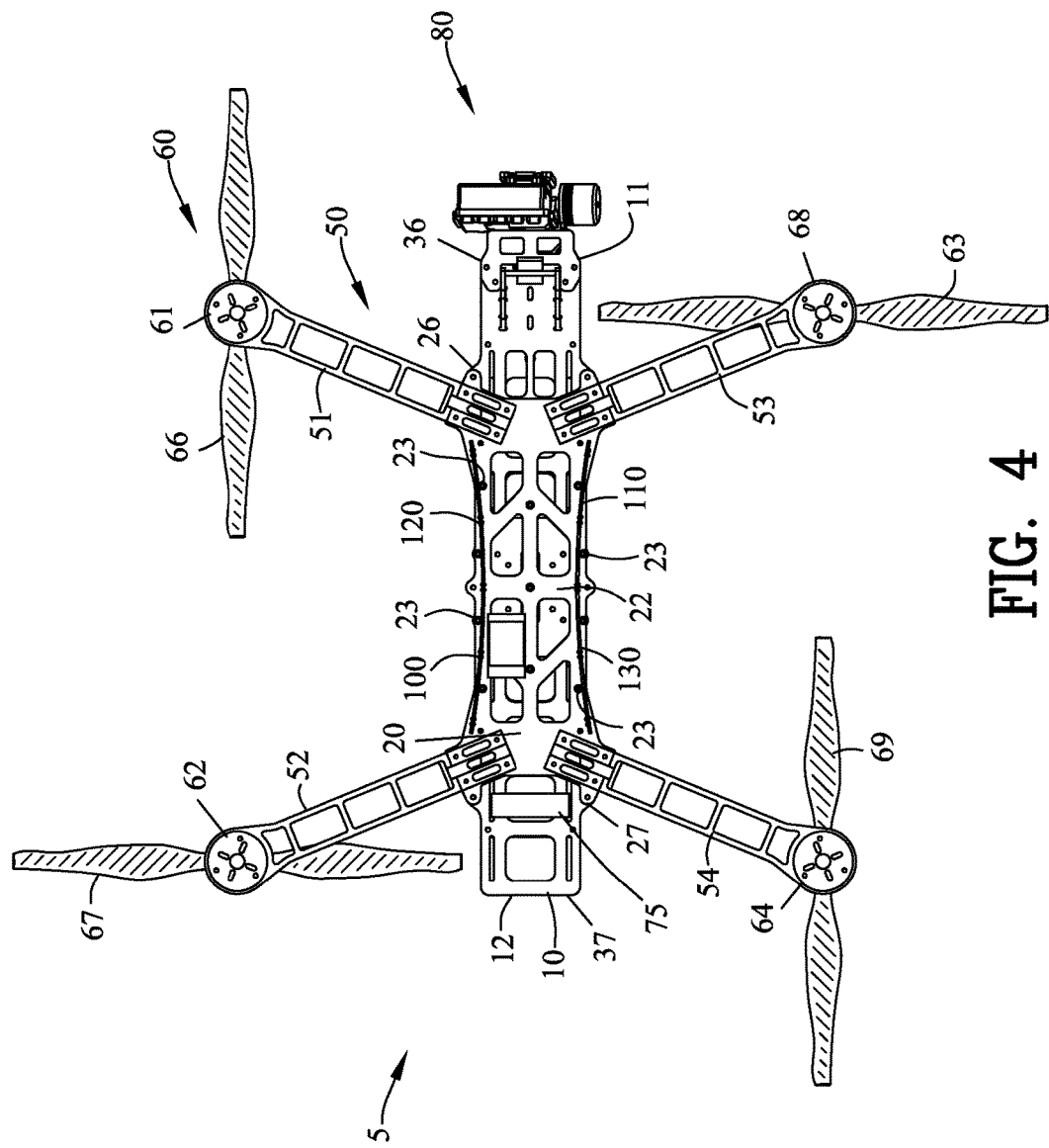
FIG. 4 is a bottom view of the rotary wing aircraft of FIG. 1.

FIGS. 1-4 illustrate a rotary wing aircraft 5 shown as an unmanned rotary wing aircraft. Although the rotary wing aircraft 5 has been shown as unmanned rotary wing aircraft, it should be understood that the present invention is applicable to other types of aircraft and land vehicles.

The rotary wing aircraft 5 comprises a frame 10 extending between a first and a second end 1 and 12 bounded by a first and a second edge 13 and 14. The frame comprises a power frame 20 shown as a bottom frame 20 and a carrier frame 30 shown as a top frame. Although the power frame 20 has been shown as a bottom frame and the carrier frame 30 has been shown as a top frame, the arrangement may be reversed with the carrier frame being a bottom frame and the power frame being a top frame.

The power frame 20 includes a power frame lower element 21 and a power frame upper element 22. A plurality of power frame supports 23 interconnect the power frame lower element 21 with the power frame upper element 22 in a substantially parallel relationship. The power frame supports 23 are secured by lower and upper threaded fasteners 28 and 29 to the power frame lower element 21 with the power frame upper element 22. The power frame 20 extends between a first end 26 and a second end 27.

The carrier frame 30 includes a carrier frame lower element 31 and a carrier frame upper element 32. A plurality of carrier frame supports 33 interconnect the carrier frame lower element 31 with the carrier frame upper element 32 in a substantially parallel relationship. The carrier frame supports 33 are secured by lower and upper threaded fasteners 38 and 39 to the carrier frame lower element 31 with the carrier frame upper element 32. The carrier frame 30 extends between a first end 36 and a second end 37.

A plurality of resilient couplers 40 interconnect the power frame 20 to the carrier frame 30. As will be described in greater detail hereinafter, the plurality of resilient couplers 40 isolate the power frame 20 from the carrier frame 30.

The plurality of arms 50 shown as arms 51-54 extend from the power frame 20 in a pattern commonly referred to as an H frame pattern. Each of the plurality of arms 51-54 are connected to the power frame 20 between the power frame lower element 21 and the power frame upper element 22. Preferably, the plurality of arms 51-54 extend into the power frame 20 between the power frame lower element 21 and a power frame upper element 22 to add structural stability to the plurality of arms 51-54.

A plurality of arms 50 support a plurality of electric motors 60 for driving a plurality of propellers 65. The plurality of arms 51-54 support electric motors 61-64 for driving propellers 66-69. The plurality of electric motors 61-64 are individually controlled through electrical conductors (not shown) as should be well known to those skilled in the art.

In the embodiment, the carrier frame 30 including the carrier frame lower element 31 and the carrier frame upper element 32 extend beyond the longitudinal length of the power frame 20. The carrier frame 30 is adapted to receive a variety of electronic components and other accessories to enabling remote flight, remote sensing and/or remote delivery of items.

The plurality of resilient couplers 40 isolate vibration generated by the plurality of electric motors 61-64 driving propellers 65-69 present in the power frame 20 from the electronic components, accessories and/or items present in the carrier frame 30. The reduction of vibration within the carrier frame 30 provides for enhanced operation of the electronic components, accessories and/or payloads in or on the carrier frame 30.

Preferably, flight electronic components 70 enabling remote flight are mounted between the carrier frame lower element 31 and the carrier frame upper element 32. In the example, flight electronics components 70 including an electronic flight control 71 and a transceiver 72 and an optional GPS system 73 are mounted between the carrier frame lower element 31 and the carrier frame upper element 32. A battery 74 is adjustably mounted between the carrier frame lower element 31 and the carrier frame upper element 32. The battery 74 is secured within the carrier frame 20 by suitable means such as a tension strap 75 and the like.

A flight camera 77 is rigidly mounted to the carrier frame lower element 31 at the first end 11 of the frame 10 for showing the actual flight direction and attitude of the rotary wing aircraft 5. The flight camera 77 enables an operator to visually determine the flight direction and attitude to remotely fly the rotary wing aircraft 5. An antenna array 78 is mounted upon the carrier frame upper element 32. The antenna array 78 is connected to the electronic flight control 71 and the transceiver 72 and the optional GPS system 73 and the flight camera 77 for communication with a remote operator station (not shown) for flying the rotary wing aircraft 5 and for exchanging information between the rotary wing aircraft 5 and the remote operator station (not shown).

An accessory 80 may be mounted within or external the carrier frame 30. In the example, the accessory 80 is shown as a gimbal 81 supporting a high definition camera 82. mounted to the front of the carrier frame 30. In the alternative, the accessory 80 may include a sensor for sensing conditions about the rotary wing aircraft 5. Examples of such sensors include but not limited to weather sensors, gas sensors, radiation sensors, audio sensors, motion sensors and the like. The accessory 80 is connected to the transceiver 72 and the antenna array 78 for exchanging data from the accessory 80 to the remote operator station (not shown).

A delivery payload 90 may be mounted external the carrier frame 30. The delivery payload 90 may include payloads to be delivered to a remote location by the rotary wing aircraft 5. The delivery payload 90 may be delivered by landing the rotary wing aircraft 5 at a remote location or by remotely releasing the delivery payload 90 from the flying rotary wing aircraft 5. It should be appreciated by those skilled in the art that the delivery payload 90 may include a variety of items too numerous to mention.

Figure 5:
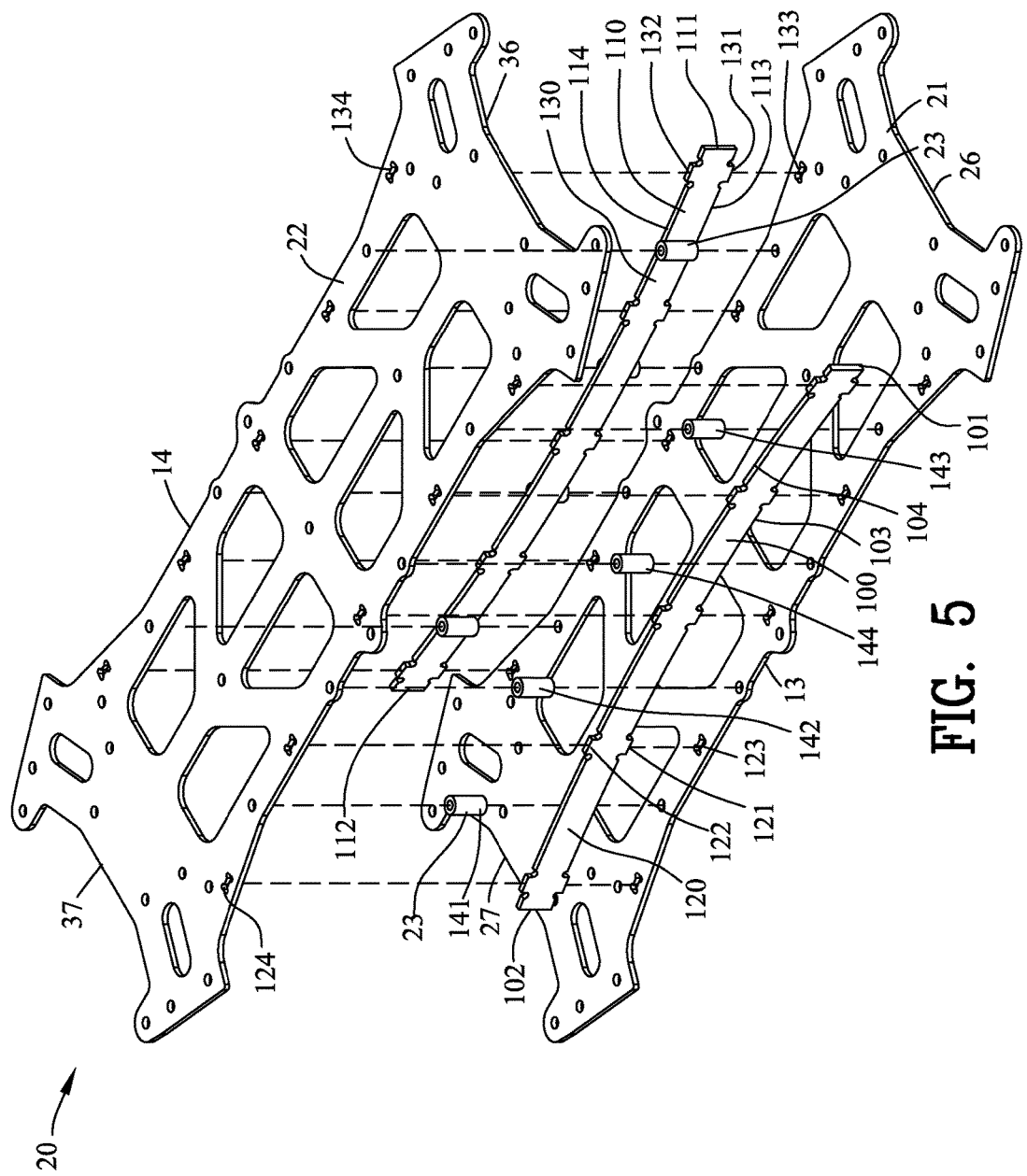
FIG. 5 is an enlarged exploded view of a lower frame of the rotary wing aircraft.

FIG. 5 is an enlarged exploded view of the power frame 20 of the rotary wing aircraft 5. The power frame 20 of the rotary wing aircraft 5 includes a beam 100 incorporating the present invention. The beam 100 extends between a first and a second end 101 and 102 and is bound by a lower and an upper edge 103 and 104. The beam 100 is formed from a lightweight, strong and resilient bendable material. Materials suitable for use as the beam 100 include thin aluminum, carbon fiber, fiberglass and the like.

In this embodiment, a second beam 110 extends between a first and a second end 111 and 112 and is bound by a lower and an upper edge 113 and 114. The first and second beams 100 and 110 extend longitudinally between the first and second ends 26 and 27 of the power frame 20 and located adjacent to the first and second edges 13 and 14 of the power frame 20, respectively.

A first and a second coupling 120 and 130 secure the first and second beams 100 and 110 to the power frame lower element 21 and the power frame upper element 22 for stabilizing the power frame 20 to reduce flexing and vibration of the power frame 20.

The first coupling 120 comprises a plurality of lower tabs 121 extending from the lower edge 103 of the beam 100 and a plurality of upper tabs 122 extending from the upper edge 104 of the beam 100. The first coupling 120 includes a plurality of lower recesses 123 defined in the power frame lower element 21 and plurality of upper recesses 124 defined in the power frame upper element 22.

The plurality of lower recesses 123 are arranged in an arc pattern in the power frame lower element 21. Similarly the plurality of upper recesses 124 are arranged in an arc pattern in the power frame upper element 22.

The second coupling 130 comprises a plurality of lower tabs 131 extending from the lower edge 113 of the beam 110 and a plurality of upper tabs 132 extending from the upper edge 114 of the beam 110. The second coupling 130 includes a plurality of lower recesses 133 defined in the power frame lower element 21 and a plurality of upper recesses 134 defined in the power frame upper element 22.

The plurality of lower recesses 133 are arranged in an arc pattern in the power frame lower element 21. Similarly the plurality of upper recesses 134 are arranged in an arc pattern in the power frame upper element 22.

The lower and upper tabs 121 and 122 of the first beam 100 are insertable into the lower and upper recesses 123 and 124 for securing the beam 100 between the power frame lower element 21 and the power frame upper element 22. Similarly, the lower and upper tabs 131 and 132 of the second beam 110 are insertable into the lower and upper recesses 133 and 134 for securing the beam 110 between the power frame lower element 21 and the power frame upper element 22. The arcuate pattern of the plurality of lower recesses 123 and 133 and the plurality of upper recesses 124 and 134 create a bend or curve in the resilient beams 100 and 110.

The bend or curve of the resilient beams 100 and 110 add mechanical strength to the power frame 20 as should be well known to those skilled in the structural art. Although the bend or curve in the resilient beams 100 and 110 is shown as a concave bend to a person facing either the first or the second edge 13 and 14 of the power frame 20 but it should be understood that the bend or curve may be convex or any other suitable bend or curve capable of adding mechanical strength to the power frame 20.

The plurality of power frame supports 23 interconnecting the power frame lower element 21 to the power frame upper element 22 for applying a compressive force between the power frame lower element 21 and the power frame upper element 22. The compressive force applied between the power frame lower element 21 and the power frame upper element 22 maintains the insertion of the lower tabs 121 and 131 into the lower recesses 123 and 133 in the power frame lower element 21 and maintains the insertion of the upper tabs 122 and 132 into the upper recesses 124 and 134 in the power frame upper element 22 to maintain the bends or curves in the beams 100 and 110.

As best shown in FIG. 5, the power frame supports 23 include at least a first support 141, a second support 142 and a third support 143 interconnecting the power frame lower element 21 to the power frame upper element 22 adjacent to the first curved beam 100. In this example of the invention. The second support 142 is offset relative to the first support 141 and the third support 143. In this example, a fourth support 144 is offset also relative to the first support 141 and the third support 143. The beam 100 is positioned to be outboard of the first and third supports 141 and 143 and inboard of the second and fourth supports 142 and 144. The radius of curvature or bending of the beams 100 and 110 is normal to the compression loading of the beams 100 and 110 applied by the plurality of power frame supports 23 interconnecting the power frame lower element 21 to the power frame upper element 22.

The curvature or bending of the beams 100 and 110 provides additional strength in several dimensions. Firstly, the curvature or bending of the beams 100 and 110 provides additional strength to the compression loading of the beams 100 and 110 applied by the plurality of power frame supports 23 interconnecting the power frame lower element 21 to the power frame upper element 22. Secondly, the curvature or bending of the beams 100 and 110 inhibits racking or the lateral movement of the power frame lower element 21 relative to the power frame upper element 22. Thirdly, the curvature or bending of the beams 100 and 110 inhibits the longitudinal movement of the power frame lower element 21 relative to the power frame upper element 22.

The curvature or bending of the beams 100 and 110 provides additional strength in several dimensions addition to the mechanical strength of the power frame 11 and the stresses thereupon caused by the force and vibration generated by the individually operated plurality of electric motors 61-64 and the associated plurality of driven propeller 65-69. The curvature or bending of the beams 100 and 110 provides a low cost and light weight solution for strengthening the frame of a rotary wing aircraft 5.

Although the present invention has been set forth with the beams 100 and 110 being located in the power frame 10, it should be understood that similar beams may be incorporated into the carrier frame 20.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An Improved frame for a rotary wing aircraft, comprising: a power frame having a power frame lower element and a power frame upper element;

said power frame lower element extending between a first power frame lower end and;

said power frame upper element extending between a first power frame upper end and a second power frame upper end;

said power frame lower element and said power frame upper element being disposed in a substantially parallel relationship;

a curved beam extending between a curved beam first end and a curved beam second end and having a lower and an upper edge;

said first and second beam ends being located longitudinally in proximately to said first and second power frame lower ends and said first and second power frame upper ends, respectively;

a coupling for securing said lower and said upper edge of said curved, beam to said power frame lower element and said power frame upper element wherein said curved beam inhibits racking or lateral movement of the power frame lower element relative to the power frame upper element.

2. An improved frame for a rotary wing aircraft as set forth in claim 1, wherein said curved beam is formed from a resilient material.

3. An improved frame for a rotary wing aircraft as set forth in claim 1, wherein said coupling comprises a lower tab and an upper tab extending from said lower and said upper edge of said curved beam, respectively;

a lower and an upper recess defined in said power frame lower element and said power frame upper element, respectively; and said lower and said upper tabs being insertable into said lower and said upper recesses, respectively, for securing said curved beam to said power frame.

4. An improved frame for a rotary wing aircraft as set forth in claim 1, wherein said coupling comprises a lower tab and an upper tab extending from said lower and said upper edge of said curved beam, respectively;

a lower and an upper recess defined in said power frame lower element and said power frame upper element, respectively;

said lower and said upper tabs being insertable into said lower and upper recesses, respectively, for securing said curved beam to said power frame; and a plurality of supports interconnecting said power frame lower element to said power frame upper element for applying a compressive force between said power frame lower element and said power frame upper element for maintaining insertion of said lower and said upper tabs into said lower and said upper recesses in said power frame lower element and said power frame upper element.

5. An improved frame for a rotary wing aircraft as set forth in claim 1, including a first, a second and a third support interconnecting said power frame lower element to said power frame upper element;

said first, second and third supports applying a compressive force between said power frame lower element and said power frame upper element to secure said lower and an upper edge of said curved beam to said power frame lower element and said power frame upper element.

6. An improved frame for a rotary wing aircraft as set forth in claim 1, including a first, a second and a third support located between said power frame lower element and said power frame upper element;

one of said first, second and third supports being offset relative to the other of said first, second and third supports; and said curved beam being positioned along said first, second and third supports for accommodating said curve of said curved beam.

7. An improved frame for a rotary wing aircraft as set forth in claim 1, wherein said power frame is substantially rectangular.

8. An improved frame for a rotary wing aircraft as set forth in claim 1, wherein said power frame is substantially rectangular extending longitudinally between a first and a second end and bounded by a first and a second edge; and said curved beam including a first and second curved beam extending longitudinally between said first and second ends and located adjacent to said first and second edges, respectively.

9. An improved frame for a rotary wing aircraft as set forth in claim 1, wherein said plurality of arms extend from opposed ends of said power frame for mounting a plurality of driven propellers.

10. An improved frame for a rotary wing aircraft as set forth in claim 1, including a carrier frame; and a plurality of resilient couplings connecting said carrier frame from said power frame for inhibiting transmission of vibrations from said power frame to said carrier frame.

11. An improved frame for a rotary wing aircraft, comprising:

a power frame having a power frame lower element and a power frame upper element;

a plurality of arms extending from said power frame for mounting a plurality of driven propellers;

a carrier frame;

a plurality of resilient couplings connecting said carrier frame to said power frame for inhibiting transmission of vibrations from said power frame to said carrier frame;

a sensor mounted to said carrier frame for sensing regions about the rotary wing aircraft;

an electronic flight control for control ling said plurality of driven propellers of the rotary wing aircraft;

a transceiver connected to said sensor and to said electronic fright control for receiving data from said sensor and for directing the fright of the rotary wing aircraft;

a curved beam extending between a first and a second end and having a lower and upper edge;

said curved beam extend longitudinally between and adjacent to a first power frame end and a second power frame end;

said curved beam interposed between said power frame lower element and said power frame upper element; and a coupling for securing said curved beam to said power frame lower element and said power frame upper element wherein said curved beam inhibits racking or lateral movement of the power frame lower element relative to the power frame upper element.

12. An improved frame for a rotary wing aircraft as set forth in claim 11, wherein said curved beam is formed from a resilient material.

13. An Improved frame for a rotary wing aircraft as set forth in claim 11, wherein said coupling comprises a lower tab and an upper tab extending from said lower and said upper edge of said curved beam, respectively;

a lower and an upper recess defined in said power frame lower element and said power frame upper element, respectively; and said lower and said upper tabs being insertable into said lower and upper recesses, respectively, for securing said curved beam to said power frame.

14. An improved frame for a rotary wing aircraft as set forth in claim 11, wherein said coupling comprises a lower tab and an upper tab extending from said lower and said upper edge of said curved beam, respectively;

a lower and an upper recess defined in said power frame lower element and said power frame upper element, respectively;

said lower and said upper tabs being insertable into said lower and said upper recesses for securing said curved beam to said power frame; and a plurality of supports interconnecting said power frame lower element to said power frame upper element for applying a compressive force between said power frame lower element and said power frame upper element for maintaining insertion of said lower and said upper tabs into said lower and said upper recesses in said power frame lower element and said power frame upper element.

15. An improved frame for a rotary wing aircraft as set forth in claim 11, including a first, a second and a third support interconnecting said power frame lower element to said power frame upper element;

said first, second and third supports applying a compressive force between said power frame lower element and said power frame upper element to secure said lower and said upper edge of said curved beam to said power frame lower element and said power frame upper element.

16. An improved frame for a rotary wing aircraft as set forth in claim 11, including a first, a second and a third support located between said power frame lower element and said power frame upper element;

one of said first, second and third supports being offset relative to the other of said first, second and third supports; and said curved beam being positioned along said first, second and third supports for accommodating the curve of said curved beam.

17. An improved frame for a rotary wing aircraft as set forth in claim 11, wherein said power frame is substantially rectangular.

18. An improved frame for a rotary wing aircraft as set forth in claim 11, wherein said power frame is substantially rectangular extending longitudinally between a first and a second end and bounded by a first and a second edge; and said curved beam including a first and second curved beam extending longitudinally between said first and second ends and located adjacent to said first and second edges, respectively.

19. An improved frame for a rotary wing aircraft as set forth in claim 1, wherein said curved beam includes a first and second curved beam extending longitudinally between said first and second ends and located adjacent to said first and second edges, respectively; and said first and second curved beams being a mirror image of one another.

\* \* \* \* \*